United States Patent [19]

Kitagawa et al.

[11] Patent Number: 5,201,383
[45] Date of Patent: Apr. 13, 1993

[54] IGNITION TIMING CONTROL SYSTEM FOR INTERNAL COMBUSTION ENGINES

[75] Inventors: Hiroshi Kitagawa; Shunji Takahashi; Sachito Fujimoto, all of Wako, Japan

[73] Assignee: Honda Giken Kogyo Kabushiki Kaisha, Tokyo, Japan

[21] Appl. No.: 813,632

[22] Filed: Dec. 26, 1991

[30] Foreign Application Priority Data

Dec. 28, 1990 [JP] Japan .................. 2-417317

[51] Int. Cl.$^5$ ............................................. B60K 28/16
[52] U.S. Cl. .................. 180/197; 364/426.03
[58] Field of Search ............ 180/197; 364/426.02, 364/426.03

[56] References Cited

U.S. PATENT DOCUMENTS

| | | | |
|---|---|---|---|
| 4,721,176 | 1/1988 | Kabasin et al. | 180/197 |
| 4,921,064 | 5/1990 | Wazaki et al. | 180/197 |
| 5,083,479 | 1/1992 | Ito et al. | 180/197 |
| 5,137,105 | 8/1992 | Suzuki et al. | 180/197 |

FOREIGN PATENT DOCUMENTS 62-17666  4/1987  Japan .
1-290934 11/1989  Japan .

Primary Examiner—Johnny D. Cherry
Assistant Examiner—Florian Zeender
Attorney, Agent, or Firm—Armstrong, Westerman, Hattori, McLeland, & Naughton

[57] ABSTRACT

An ignition timing control system for an internal combustion engine in which an ECU sets a basic spark advance value in response to operating condition of the engine, corrects the set basic spark advance value, and delimits the corrected spark advance value in a spark retarding direction by means of a retard limiting value. The ECU further detects operation of a slip control system which detects a predetermined slip state of driving wheels of the vehicle and controls the engine so as to reduce output thereof upon detection of the predetermined slip state. When the slip control system is operative, the ECU changes the retard limiting value toward an advanced side relative to a value set when the slip control system is inoperative.

4 Claims, 5 Drawing Sheets

IGNITION TIMING CONTROL SYSTEM FOR INTERNAL COMBUSTION ENGINES

BACKGROUND OF THE INVENTION

1. Field of the Invention

This invention relates to an ignition timing control system for internal combustion engines and, more particularly, to an ignition timing control system of this kind, which effects the ignition timing control in relation to control of slip of driving wheels of an automotive vehicle in which the engine is installed.

2. Description of the Related Art

Among conventional methods for electronically controlling the ignition timing of an internal combustion engine, there is widely known a method of controlling the ignition timing by the use of a spark ignition advance value set in dependence on operating conditions of the engine.

Conventional ignition timing control systems employing this method include an ignition timing control system which delimits a retard-side limit of a spark advance value corrected toward a retarded side in accordance with engine operating parameters etc., by means of a retard limiting value set in dependence On engine rotational speed to thereby prevent a misfire or a flashover due to sudden acceleration or sudden deceleration of the engine, as disclosed e.g. in Japanese Provisional Patent Publication (Kokai) No. 62-17666.

To suppress excessive slip of driving wheels of an automotive vehicle, there has been proposed by the assignee of the present application a slip control system which comprises slip detecting means for detecting slip of driving wheels, and control means responsive to an excessive slip of a driving wheel detected by the slip detecting means for interrupting the supply of fuel to an internal combustion engine installed in the vehicle (fuel out) or leaning the air-fuel ratio of a mixture supplied to the engine or retarding the ignition timing to thereby reduce the driving force or torque of the engine for suppression of the excessive slip (e.g. Japanese Provisional Patent Publication (Kokai) No. 1-290934).

In an internal combustion engine in general, the voltage required to be applied to the spark plug to cause sparking thereof (hereinafter called "spark voltage") changes as the air-fuel ratio of the mixture within the engine cylinder changes, even if engine operating parameters, such as intake air temperature remain unchanged. More specifically, as the air-fuel ratio of the mixture drawn into the engine cylinder becomes leaner, the ratio of an air amount contained in the mixture increases and the amount of fuel, which is conductive, decreases correspondingly. Consequently, the spark voltage becomes higher.

Therefore, if a retard limiting value defining the retard-side limit of ignition timing as disclosed in Japanese Patent Publication No. 62-17666, hereinabove referred to, which value is set to a constant value irrespective of whether or not an excessive slip occurs, is applied to control the ignition timing of an internal combustion engine having the above-mentioned slip control system, there is a problem of failure to spark by the spark plug and hence occurrence of a misfire or a flashover due to elevated spark voltage of the spark plug encountered when the air-fuel ratio is leaned upon detection of an excessive slip of a driving wheel of the vehicle.

SUMMARY OF THE INVENTION

It is the object of the invention to provide an ignition timing control system for an internal combustion engine, which is capable of improving the ignitability of the engine to thereby avoid a misfire etc., even when slip control of driving wheels of the vehicle is carried out.

To attain the above object, the present invention provides an ignition timing control system for an internal combustion engine installed in a vehicle having driving wheels, and having slip control means for detecting a predetermined slip state of the driving wheels and controlling the engine so as to reduce output thereof upon detection of the predetermined slip state, the system including engine operating condition detecting means for detecting operating conditions of the engine, setting means responsive to operating conditions of the engine detected by the engine operating condition detecting means for setting a basic spark advance value, correcting means for correcting the basic spark advance value set by the setting means, and retard limiting means for setting a retard limiting value and delimiting the spark advance value corrected by the correction means, in a spark retarding direction by means of the retard limiting value.

The ignition timing control system according to the invention is characterized by an improvement comprising:

slip control operation detecting means for detecting whether or not the slip control means is operative and limiting value changing means responsive to an output from the slip control operation detecting means for changing the retard limiting value set by the retard limiting means, to an advanced side relative to a value set when the slip control means is inoperative, when the slip control means is detected to be operative.

In a preferred embodiment, the slip control means leans the air-fuel ratio of a mixture supplied to the engine when the slip control means is detected to be operative.

The above and other objects, features, and advantages of the invention will be more apparent from the following detailed description taken in conjunction with the accompanying drawings.

DETAILED DESCRIPTION OF THE PREFERRED EMBODIMENTS

The invention will now be described in detail with reference to the drawings showing an embodiment thereof.

Figure 1:
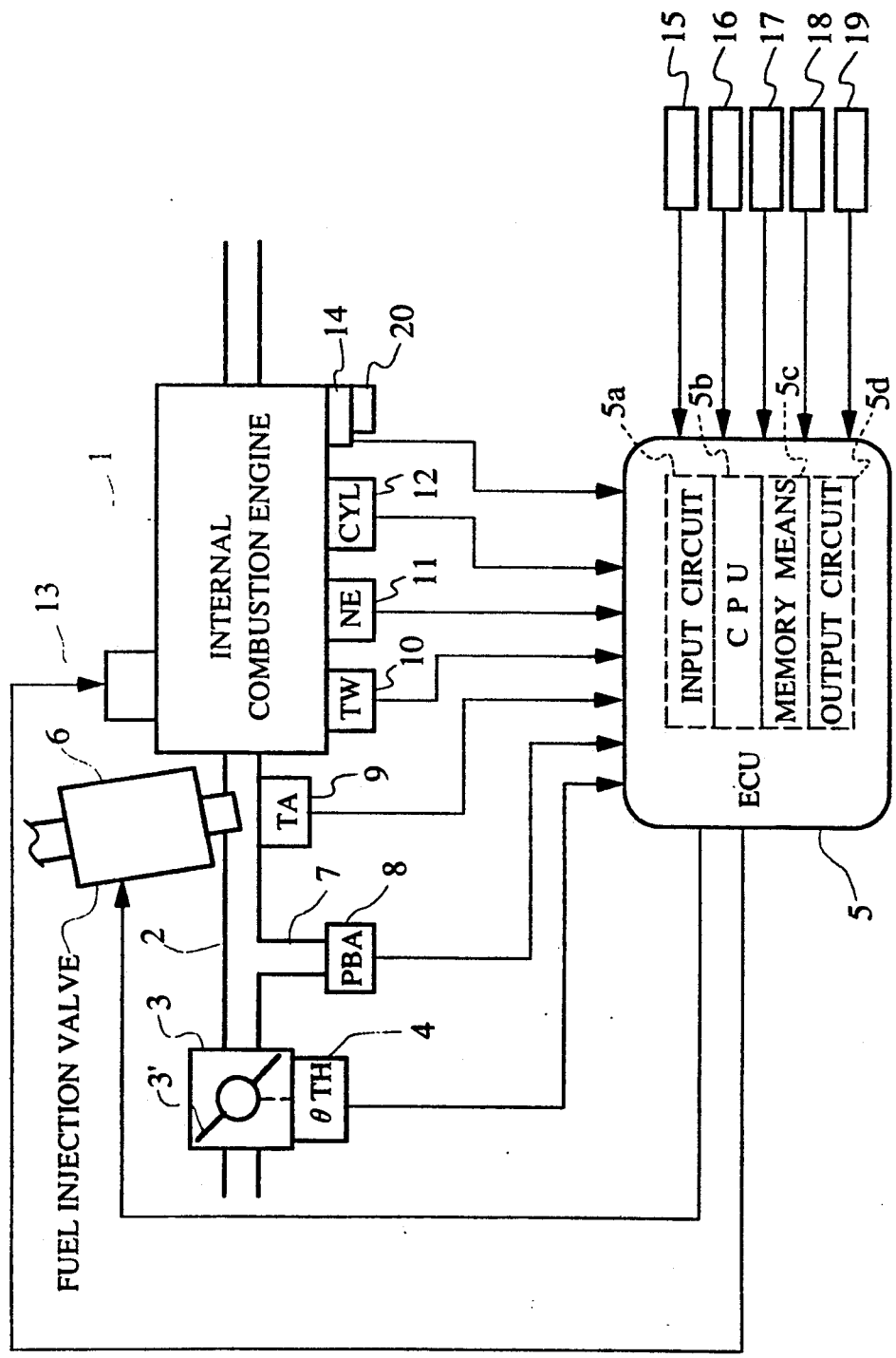
FIG. 1 is a block diagram showing the whole arrangement of an internal combustion engine incorporating an ignition timing control system according to the invention.

Referring first to FIG. 1, there is shown the whole arrangement of an ignition timing control system according to an embodiment of the invention.

In the figure, reference numeral 1 designates an internal combustion engine having four cylinders, and a pair of intake valve and exhaust valve (not shown) provided at each cylinder.

In an intake pipe 2 of the engine 1, there is arranged a throttle body 3 accommodating a throttle valve 3' therein. A throttle valve opening ($\theta$TH) sensor 4 is connected to the throttle valve 3' for supplying an electric signal indicative of the sensed throttle valve opening to an electronic control unit ("hereinafter referred to as the ECU") 5.

Fuel injection valves 6 are each provided for each cylinder and arranged in the intake pipe 2 at a location between the engine 1 and the throttle valve 3', and slightly upstream of the intake valve. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure to &he ECU 5. An intake air temperature (TA) sensor 9 is mounted in the wall of the intake pipe 2 at a location downstream of the conduit 7 for supplying an electric signal indicative of the sensed intake air temperature TA to the ECU 5. An engine coolant temperature (TW) sensor 10 which is formed of a thermistor or the like is inserted into the wall of an engine cylinder filled with engine coolant in the cylinder block of the engine I, for supplying the sensed coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A spark plug 13 of each cylinder of the engine 1 is electrically connected to the ECU 5 to have its ignition timing $\theta$ig controlled by a signal therefrom.

A transmission 14 is interposed between a pair of left and right front wheels 20 as driving wheels of a vehicle in which the engine is installed and an output shaft of the engine 1 to transmit output torque of the engine 1 to the driving wheels 20 to rotate same.

Driving wheel speed sensors (hereinafter referred to as "the VW sensors") 15 and 16, and trailing wheel speed sensors (hereinafter referred to as "the V sensors") 17 and 18 are provided, respectively, for the driving wheels (front wheels) 20 and a pair of left and right trailing wheels (rear wheels), not shown. The VW sensors 15, 16 detect the rotational speeds VWL, VWR of the respective left and right driving wheels 20, and the V sensors 17, 18 detect the rotational speed VL, VR of the respective left and right trailing wheels. Electric signals indicative of the sensed wheel speeds from these sensors are supplied to the ECU 5.

Further electrically connected to the ECU 5 are sensors 19 for sensing other parameters such as the reduction ratio of the transmission 14, from which electric signals indicative of the sensed parameter values are supplied to the ECU 5.

The ECU 5 comprises an input circuit 5a having the functions of shaping the waveform of input signals from the above-mentioned sensors, shifting the voltage levels of sensor output signals to a predetermined level, converting analog signals from analog-output sensors to digital signals, and so forth, a central processing unit (hereinafter referred to as "the CPU") 5b, memory means 5c including a ROM storing various operational programs which are executed in the CPU 5b, and a RAM for storing results of calculations therefrom, etc., and an output circuit 5b which outputs driving signals to the fuel injection valves, and the spark plugs 13.

The ECU 5 constitutes setting means for setting a basic spark advance value, hereinafter referred to, correcting means for correcting the set basic spark advance value, slip control means, slip control operation detecting means for detecting operation of the slip control means, and limiting value changing means for changing a retard limiting value, hereinafter referred to, which delimits a retard-side limit of a spark advance value based upon the basic spark advance value.

In the ECU 5 constructed as above, the fuel injection period (valve opening period) Tout is calculated in response to operating conditions of the engine 1, and the ignition timing control is effected in a predetermined manner in response to operating conditions of the engine 1.

More specifically, the CPU 5b is responsive to operating conditions of the engine 1 detected by the aforementioned sensors to calculate the fuel injection period (valve opening period) Tout by the use of the following equation (1), in synchronism with generation of TDC signal pulses:

$$Tout = Ti \times KSTB \times K_1 + K_2 \qquad (1)$$

where Ti represents a basic fuel injection period corresponding to a basic fuel quantity which is determined as a function of engine rotational speed NE and absolute pressure PBA within the intake pipe 2, for instance. The memory means 5c stores a Ti value map from which a Ti value is to be read.

KSTB represents a slip control correction coefficient which is set in dependence On a slip factor $\lambda$ of the driving wheels 20, hereinafter referred to, such that it is set to a value less than 1.0 when an excessive slip of a driving wheel is detected, and to 1.0 when no excessive slip is detected.

$K_1$ and $K_2$ represent other correction coefficients and variables, respectively, which are determined to respective appropriate values optimizing characteristics of the engine such as fuel consumption and accelerability.

Further, the CPU 5b calculates a spark advance value (ignition timing value) $\theta$IG by the use of the following equation (2);

$$\theta IG = \theta IGMAP - \Delta\theta IG \qquad (2)$$

where $\theta$IGMAP represents a basic spark advance value which is determined in accordance with operating conditions of the engine 1, e.g. as a function of engine rotational speed NE and absolute pressure PBA within the intake pipe 2 representative of load on the engine 1.

In the present embodiment, the basic spark advance value θIGMAP is read from an ignition timing map stored in the memory means 5c, in accordance with engine rotational speed NE and intake pipe absolute pressure PBA.

θIG represents a correction value which is read from a correction value map stored in the memory means 5c in accordance with engine coolant temperature TW, intake air temperature TW, etc.

In the ignition timing control system according to this embodiment, a retard limiting value θIGGi (i=H or L), which is a limit value in the spark retarding direction, is provided for the spark advance value θIG calculated by the equation (2) to delimit the maximum value of the ignition timing in the spark retarding direction. The retard limiting value θIGGi is changed according to the slip state of the driving wheels 20.

Figure 2:
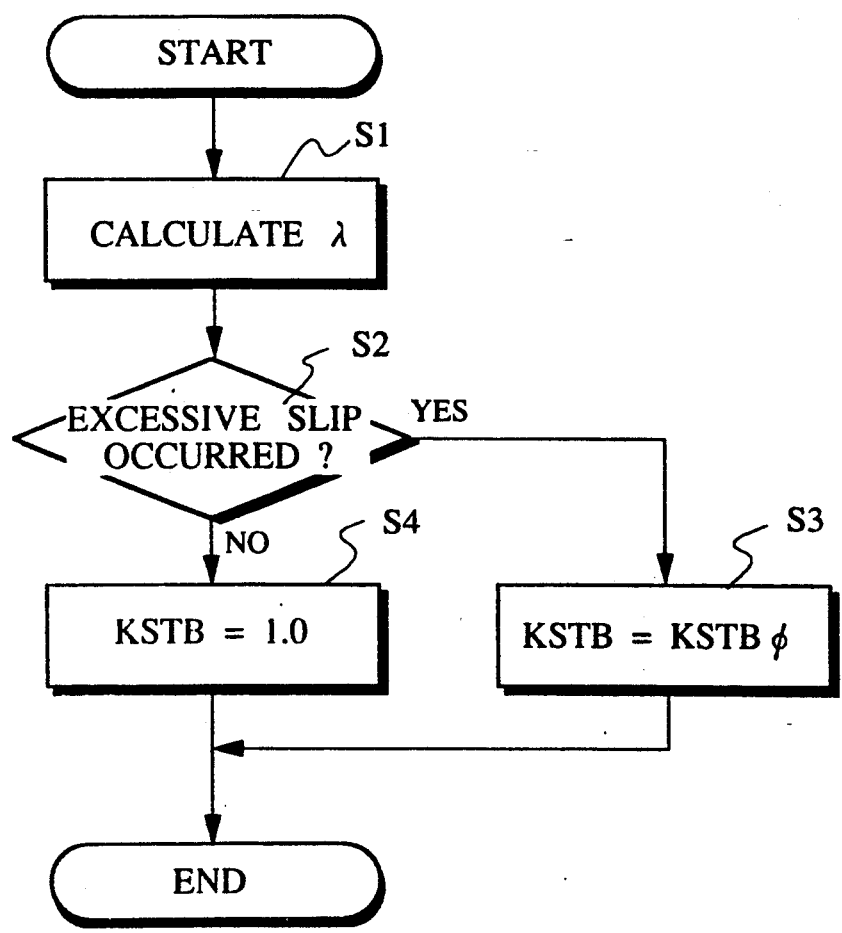
FIG. 2 is a flowchart showing a manner of controlling slip of driving wheels of the vehicle by slip control means.

FIG. 2 shows a manner of detecting a slip of each driving wheel 20, and controlling the slip state of the driving wheel 20 in response to the detected slip. This program is executed upon generation of each TDC signal pulse and in synchronism therewith.

First, at a step S1 in FIG. 2, one of the speeds VWL, VWR of the left and right driving wheels is selected and adapted as the driving wheel speed VW, and the speed VL or VR of the trailing wheel on the same side as the driving wheel whose speed VWL or VWR has been selected is selected and adapted as the vehicle speed V. The slip factor λ is calculated from the speeds VW, V by the following equation (3):

$$\lambda = \frac{VW - V}{VW} \quad (3)$$

Then, at a step S2, it is determined whether or not an excessive slip of a driving wheel has occurred, based upon the slip factor λ calculated above. This determination of excessive slip is made by determining whether or not the slip factor λ exceeds a predetermined value. If it is determined at the step S2 that an excessive slip has occurred, the slip control correction coefficient KSTB is set to a predetermined value KSTB φ smaller than 1.0 and depending upon the slip degree, at a step S3. The set coefficient KSTB is substituted into the equation (1) to calculate the fuel injection period Tout having a decreased value, whereby the air-fuel ratio of a mixture supplied to engine is leaned to suppress the excessive slip. Further, fuel cut or retardation of the ignition timing may be performed in response to the slip state of the driving wheels 20.

On the other hand, if it is determined at the step S2 that no excessive slip has occurred, the coefficient KSTB is set to 1.0 at a step S4, followed by terminating the program.

Figure 3:
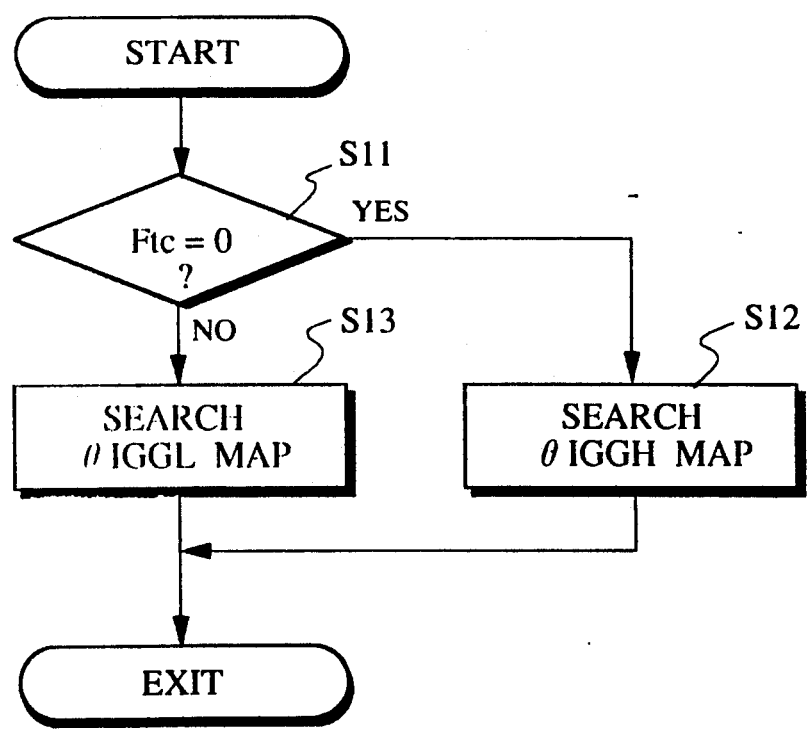
FIG. 3 is a flowchart showing a manner of selecting retard correction value (retard limiting value) maps in response to operation of the slip control means.

FIG. 3 shows a manner of selecting maps of retard limiting value θIGGi, which are selectively retrieved depending upon whether or not the slip control means is operative.

First, it is determined at a step S11 whether or not a flag Ftc has been set to "1". That is, whether or not a driving wheel is in an excessive slip state is determined from the state of the flag Ftc, i.e. "1" or "0". If the flag Ftc has been set to "0". it is judged that neither of the driving wheels is in an excessive slip state. Then, the retard limiting value θIGGH map to be selected when the slip control means is inoperative is selected and searched to read a retard limiting value θIGGH at a step S12. On the other hand, if the flag Ftc assumes "1", it is judged that a driving wheel is in an excessive slip state. Then, the retard limiting value θIGGL map to be selected when the slip control means is operative is selected and searched to read a retard limiting value θIGGL at a step S13.

Figure 4:
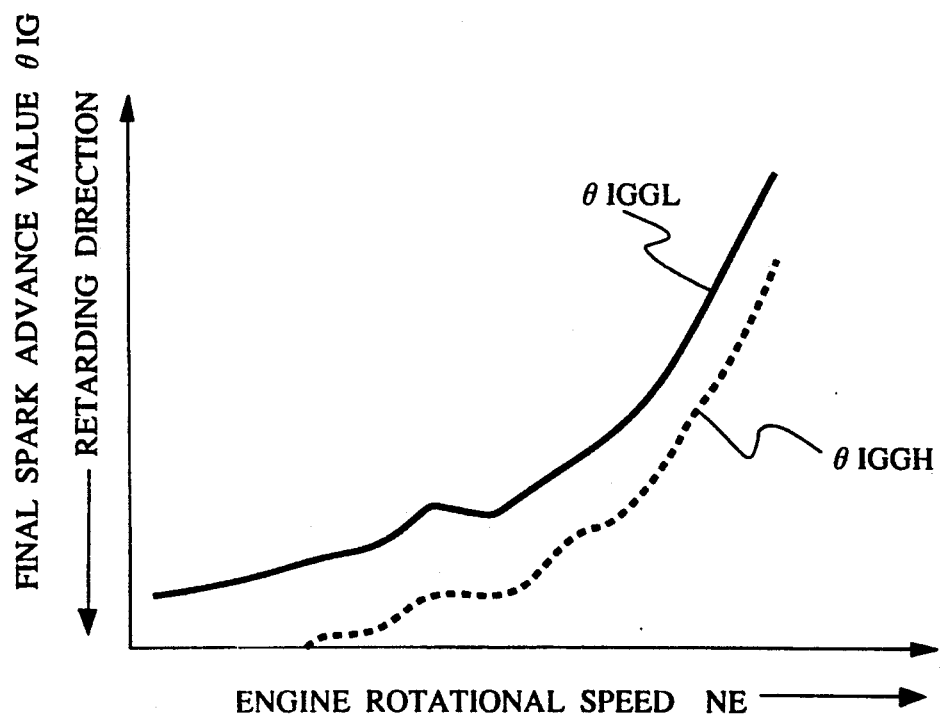
FIG. 4 is a graph showing curved lines representing retard correction values selected according to the manner of FIG. 3.

FIG. 4 shows a retard limiting value θIGGL curve set in the θIGGL map and a retard limiting value θIGGH curve set in the θIGGH map. In the graph of FIG. 4, the abscissa represents engine rotational speed NE, and the ordinate the final spark advance value θIG.

Figure 5:
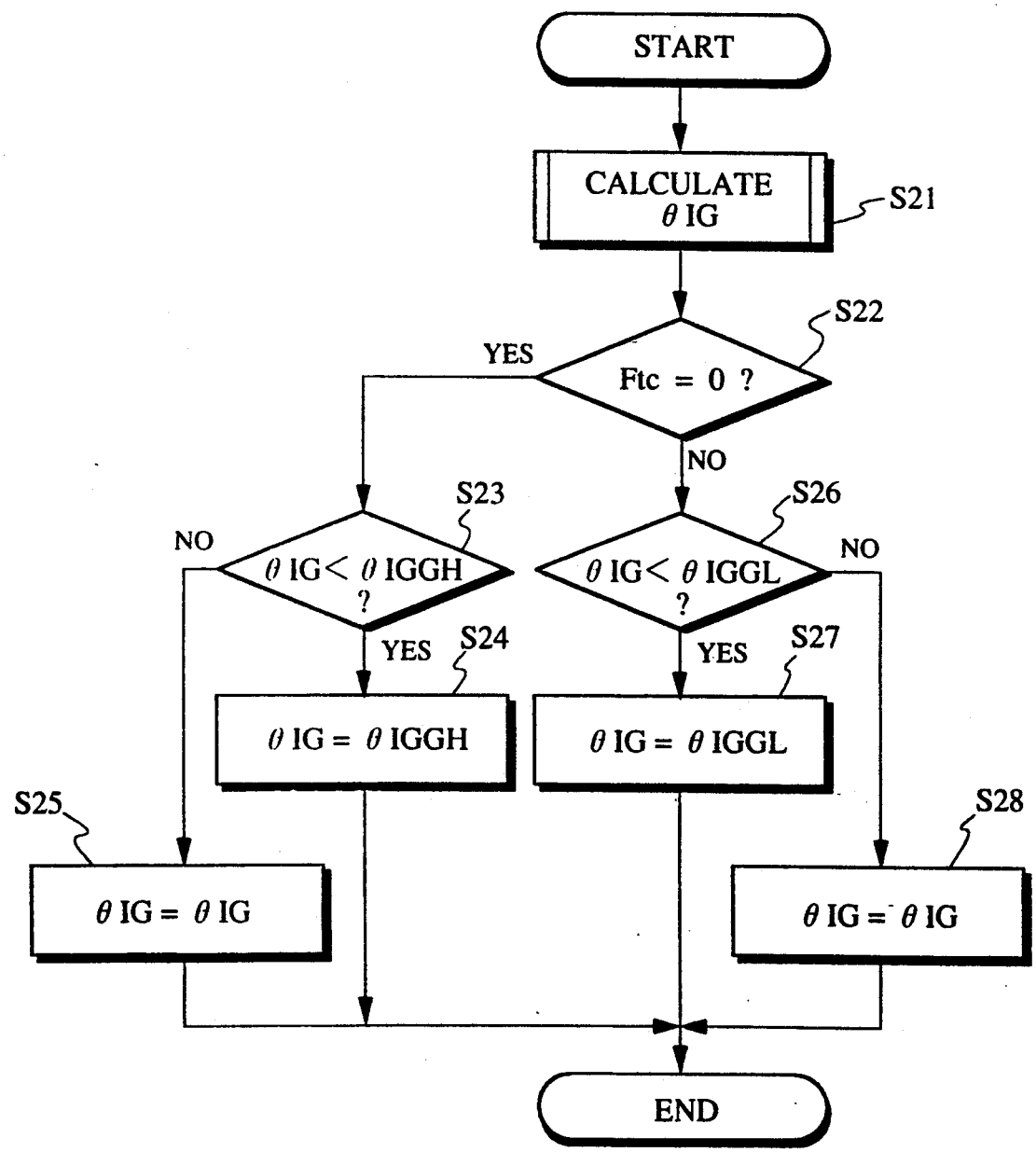
FIG. 5 is a flowchart showing a manner of setting a final spark advance value (ignition timing value).

As shown in FIG. 4, according to the present embodiment, when i& is judged that the slip control means is inoperative, i.e. neither of the driving wheels is in an excessive slip state, the final spark advance value θIG is limited in the spark retarding direction by the retard limiting value θIGGH, whereas when the slip control means is operative, the value θIG is limited in the spark retarding direction by the retard limiting value θIGGL which is set on an advanced side relative to the retard limiting value θIGGH, so that the ignition timing is controlled by the spark ignition changing value θIGGL. As a result, positive sparking can be assured even when the air-fuel ratio is leaned to suppress an excessive slip of the driving wheel so that the fuel amount within the engine cylinder decreases and hence the conductivity within the engine cylinder is degraded, thus enabling to prevent a misfire or a flashover. It has been experimentally ascertained that if the retard limiting value θIGGL is set in the vicinity of values of the basic spark advance value θIG in the θIG map which are assumed when the engine is in a full load operating condition (WOT), best results can be obtained FIG. 5 shows a manner of effecting the retard limitation against the spark advance value θIG by the use of the retard limiting value θIGGi selected according to whether the slip control means is operative. This program is executed upon generation of each TDC signal pulse and in synchronism therewith.

First, at a step S21 in FIG. 5, the spark advance value θIG is calculated by first reading the basic spark advance value θIGMAP from the basic ignition timing map, and then correcting the read θIGMAP value by the correction value θIG by the equation (2), and the calculated θIG value is stored into the memory means 5c.

Then, it is determined at a step S22 whether or not the flag Ftc assumes "0". If the flag Ftc assumes "0", it is judged that neither of the driving wheels is in an excessive slip state. Then, it is determined at a step S23 whether or not the spark advance value θIG calculated above exceeds the retard limiting value θIGGH, i.e. whether or not the former has a value on L the retarded side relative to the latter (θIG<θIGGH). If θIG<θIGGH, it is judged that if the ignition timing is set by the spark advance value θIG, there can occur a misfire etc., and accordingly the final spark advance value θIG is set to the retard limiting value θIGGH at a step S24, followed by effecting spark ignition based upon the set final spark advance value θIG, i.e. the retard limiting value θIGGH.

If θIG≧θIGGH, the final spark advance value θIG is set to the spark advance value θIG calculated by the use of the equation (2), at a step S25, followed by effecting spark ignition based upon the set final spark advance value θIG.

On the other hand, if the flag Ftc is determined to assume "1", at the step S22, it is judged that the slip control means is operative, i.e. a driving wheel is in an excessive slip state. Then, it is determined at a step S26 whether or not the spark advance value θIG calculated at the step S21 exceeds the retard limiting value θIGGL set on the advanced side relative to the retard limiting value θIGGH, i.e. whether or not the former has a value on the retarded side relative to the retard limiting value θIGGH (θIG<θIGGL). If θIG<θIGGL, the final spark advance value θIG is set to the retard limiting value θIGGL at a step S27 to avoid a misfire etc., followed by effecting spark ignition based upon the set final θIGGL value.

On the other hand, if θIG≧θIGGL, the final spark advance value θIG is set to the spark advance value θIG calculated at the step S21, at a step S28, followed by effecting spark ignition based upon the set final θIG value.

The embodiment described above is not limitative. For example, although in the above described embodiment the vehicle is a front-wheel-drive vehicle, the invention may be applied to a rear-wheel-drive vehicle as well. Further, the slip control method is not limited to one shown in FIG. 2, but various variations thereof may be applied. Although in the above described embodiment two retard limiting value maps are used, i.e. the θIGGL map and the θIGGH map, a single map, e.g. a θIGGH map, may be used such that the θIGGL value is obtained by subtracting a certain value from the θIGGH value.

As described above, the ignition timing control system according to the invention comprises slip control operation detecting means for detecting operation of slip control means which detects a predetermined slip state of driving wheels of the vehicle and controls the engine so as to reduce output thereof to thereby suppress the predetermined slip state, and limiting value changing means for changing a retard limiting value set by retard limiting means to an advanced side relative to a value set when the slip control means is inoperative, when the slip control means is detected to be operative by the slip control operation detecting means.

Therefore, positive spark ignition can be assured to avoid a misfire or a flashover even if the conductivity within engine cylinders is degraded due to a decrease in the fuel amount within the engine cylinders caused by leaning of the air-fuel ratio.

What is claimed is:

1. In an ignition timing control system for an internal combustion engine installed in a vehicle having driving having valve, and slip control means for detecting a predetermined slip state of said driving wheels and controlling said engine so as to reduce output thereof upon detection of said predetermined slip state, said system including engine operating condition detecting means for detecting operating conditions of said engine, setting means responsive to operating conditions of said engine detected by said engine operating condition detecting means for setting a basic spark advance value, correcting means for correcting said basic spark advance value set by said setting means, and retard limiting means for setting a retard limiting value and delimiting said spark advance value corrected by said correcting means, in a spark regarding direction by means of said retard limiting value, the improvement comprising:
  slip control operation detecting means for detecting whether or not said slip control means is operative;
  limiting value changing means responsive to an output from said slip control operation detecting means for changing said retard limiting value set by said retard limiting means, to an advanced side relative to a value set when said slip control means is inoperative, when said slip control means is detected to be operative; and
engine operating control means which controls the ignition timing in accordance with the retard limiting value.

2. An ignition timing control system as claimed in claim 1, wherein when said slip control means is detected to be operative, said limiting value changing means changes said retard limiting value set by said retard limiting means to a value in the vicinity of said basic spark advance value set when said engine is in a full load operating condition.

3. An ignition timing control system as claimed in claim 1 or 2, wherein said retard limiting means sets said retard limiting value in dependence on rotational speed of said engine.

4. An ignition timing control system as claimed in claim 1 or 2, wherein said slip control means leans the air-fuel ratio of a mixture supplied to said engine when said slip control means is detected to be operative.

* * * * *